VAUGHN & WINSLOW
WELDING PIPES.
No. 5,695. Patented Aug. 1, 1848.
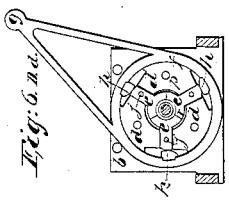
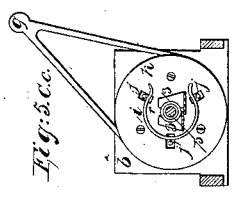
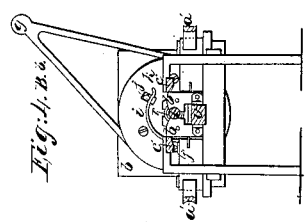
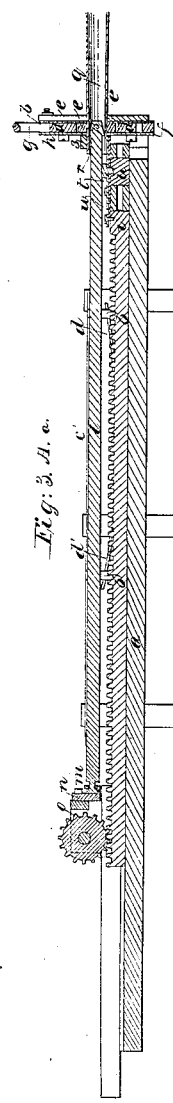
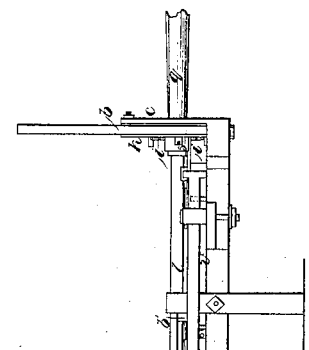
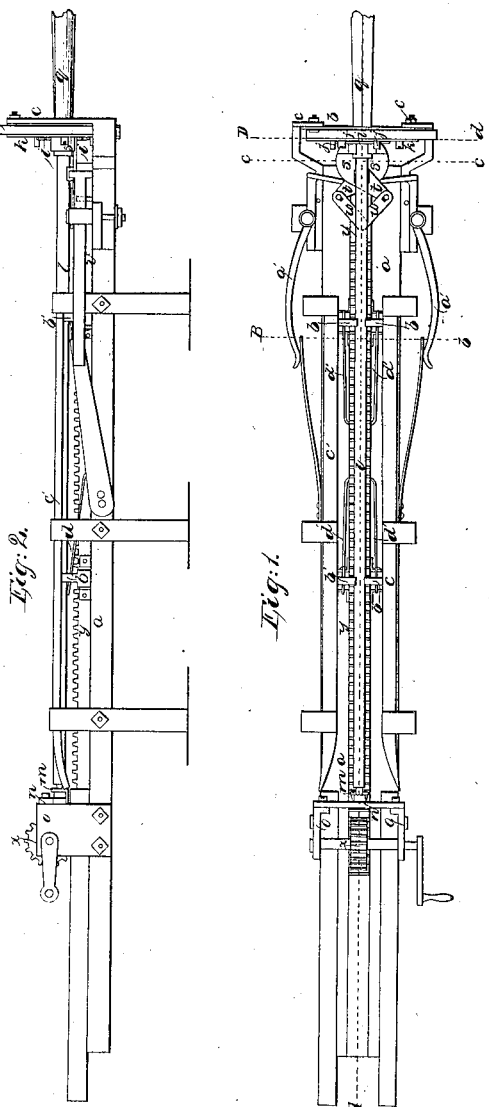

UNITED STATES PATENT OFFICE.

J. C. VAUGHN, OF GREENBUSH, AND J. F. WINSLOW, OF TROY, NEW YORK.

MACHINERY FOR WELDING IRON PIPES.

Specification of Letters Patent No. 5,695, dated August 1, 1848.

*To all whom it may concern:*

Be it known that we, JOSEPH C. VAUGHN, of Greenbush, and JOHN F. WINSLOW, of Troy, in the county of Rensselaer and State of New York, have invented new and useful Improvements in Machines for Welding Iron Tubes or Pipes, and that the following is a full, clear, and exact description of the principle or character which distinguishes them from all other things before known and of the manner of making, constructing, and using the same, reference being had to the accompanying drawings, making part of this specification, in which—

Figure 1 is a plan of the machine; Fig. 2, a side elevation; Fig. 3, a longitudinal vertical section at the line (A, a) of Fig. 1; and Figs. 4, 5, and 6 cross vertical sections taken at the lines (B b), (C, c), and (D d) of the same figure.

The same letters indicate like parts in all the figures.

Our invention relates to the method of welding iron pipes by drawing them over a core and within a die surrounding it which compresses the metal to form the weld; but this method presents the following difficulties; first, if the die be made in a single piece it cannot be adapted to any variation in the thickness of the metal forming the pipes, and, if made in sections, whenever the metal of the pipe is a little too thick, the iron of the pipe will be forced into the spaces between the sections and thus have as many ridges on the outer surface of the pipe as there are sections composing the die. Second, if the core be of equal thickness throughout its length the pipe when drawn over it will make friction all the way and thus require great force simply to overcome this friction and as the end of the pipe must be gripped to admit of its being drawn through the die the friction on the core will be greatly increased by the pressure of the grippers which in gripping the metal with sufficient force to draw the pipe must of necessity exert great force on the core which alone prevents the pipe from being flattened under the action of grippers; and third, as the stiffness of the core rods alone resists the whole force required in welding and overcoming the friction it will be obvious that the length of the core must be very limited to retain the required stiffness, and hence this method of welding could only be applied to pipes of very limited lengths. We have however remedied these defects in a great measure by our improvements.

The first difficulty we remedy by making the die in sections which slide in and out radially that they may be adapted to various thicknesses by a rotating cam ring that surrounds them, or other device analogous thereto, and to avoid the forming of ridges on the pipe by the spaces between the sections of the die we make the planes that separate these sections diagonal to the axis of the core and therefore to the motion of the pipe as it is drawn through. The second difficulty we obviate by making the stem of the core of less diameter than the part within the die that determines the inner diameter of the pipe, so that in passing through an entire length of pipe no part of the core will touch the pipe except the head; but as this alone would not afford the means of gripping the end of the pipe with sufficient force to draw it through the lie without mashing it up and thus spoiling a considerable portion of its length, we combine with the core, thus formed, a thimble or ferrule, which is adapted to slide freely on the stem of the core and made of a diameter equal to the head thereof, so that the grippers grip the end of the pipe onto this ferrule that has the strength requisite to resist the force with which the pipe must be held by the grippers to be drawn through the die. But by thus reducing the body of the core the third difficulty pointed out above is increased. This however we not only remedy by our third improvement but we are enabled by it to weld pipes of greater length than by any other plan known to us, and this consists in using stay pieces which we arrange in pairs, one on each side of the rod, which are held up against the core to embrace and steady it by two rails one on each side, these rails being made so as to spread out toward the rear end of the core that the stay pieces may be thrown open as each pair in succession reaches the end of the core. In this way the core is fully sustained against any tendency to bend until the pipe is drawn over it, and then it is sustained by the grippers and the ferrule within them and also by the stiffness of the pipe itself.

In the accompanying drawings (a) represents a bench of the required length depending on the length of pipe to be welded in the machine. At one end there is a vertical plate (b) connected with the frame by standards (c, c) and having a hole in the center of a diameter a little greater than that of the largest sized pipe intended to be welded in the machine. On the inside of this plate, and at equal distances around the central hole, there are three segments of a circle (d, d, d) projecting therefrom to the thickness of the die to be hereafter described. The spaces between these segments form ways or grooves in which slide the stems of the segments (e, e, e) that constitute the die, that these may slide radially therein, and the outer periphery of the segments (d, d, d) is adapted to receive a ring (f) which may be turned thereon by a handle (g). The inner periphery of this ring is provided with three cams (h, h, h) corresponding with the stems of the segments of the die, so that as the ring (f,) is turned in one direction the segments are forced toward the center, and when turned back they are forced back to open the die by a spring (i), which acts on pins (j, j, j) that project one from the face of each segment die and pass through a plate (k) that is secured over the whole os a cap to hold the parts in their appropriate places. The planes that form the junctions of the segments of this die instead of being parallel with the axis of the hole are diagonal thereto forming an angle of about forty five degrees therewith, so that if the die be not entirely closed when the pipe is drawn through, these spaces will not tend to form ridges on the surface.

The core (l) is a cylindrical rod of iron or steel supported at the rear end in an open collar (m) (connected by a cross bar (n) with two standards (o, o)), so that the other end shall come within the aperture of the die where it is enlarged to form the head (p), which is of the diameter of the intended inner diameter of the pipes to be welded and slightly rounded off to facilitate the passage of the pipe over it. When the core is in place the pipe (q) to be welded is taken at a welding heat and one end inserted in the die, which is opened for this purpose, and pushed over the head (p) of the core and onto a thimble or ferrule (r) of the same diameter as the head and adapted to slide freely on the stem of the core. The cam ring (g) is then turned to force the segments of the die onto the iron pipe with sufficient force to affect the welding as it is drawn through by a pair of gripping tongs (s), the levers (t, t) which turn on a fulcrum pin on a block (u) that slides freely in the groove in the forward end of a carriage (v) that slides in appropriate ways on the bench, the ends of the gripping levers being connected by joint links (w, w) with the carriage so that as the carriage is drawn back by the driving cog-wheel (x) taking into the cogs of a rack (y) on the carriage, the grippers are made to grip and hold on to the pipe with a force proportioned to the force required to draw the pipe through the die,—and of course when the motion of the carriage is reversed the grippers liberate their hold. As the end of the pipe is pushed in over the head of the core and on to the ferrule the carriage is moved forward which opens the jaws of the gripper to pass over the end of the pipe, and the moment that the carriage begins to move back the jaws of the gripper are pressed against the pipe by means of two spring levers (a', a') to commence the grip before the motion of the carriage on the arms or levers of the tongs causes them to grip the end of the pipe against the ferrule with the force required to draw it through, the ferrule being sufficiently strong to resist the force of the grip and thus prevent the pipe from being crushed.

To the sides of the carriage are jointed two or more pairs of stay pieces (b', b') the inner faces of which are curved in to embrace the core stem against which they are retained, and held, to give it the requisite support, by two rails (c', c') so that as the carriages move back in the act of drawing the pipe through the die these stay pieces move with it and give the requisite stiffness to the core stem; and as they in succession approach the rear end of the rails (c', c') spread out that the stay pieces may be thrown open by springs (d', d') to pass by the collar that supports the rear end of the core stem and the main driving cog wheel. In this way the core stem is fully sustained to give it the requisite stiffness back of the pipe, and as they move out of the way as the pipe passes onto the core, the stem, ferrule, and grippers become the supports of the pipe. After the pipe has been drawn through the die, and thereby welded, the carriage is moved back a little to open the grippers and liberate the pipe, and the stay pieces having been carried back the core with the welded pipe on it is lifted out and another core put in for a second operation, while the pipe is removed from the first core which is in this way permitted to cool.

From the foregoing it will be obvious that any of the well known mechanical equivalents may be substituted for the rack and cog wheel to give the reciprocating motions to the carriage; that the stay pieces for giving support to the steam of the coil may be made to slide on pins projecting from the carriage instead of being jointed thereto, or they may be made to slide on the rails and moved by projections from the carriage; that the grippers instead of gripping the pipe by the draft of the carriage may be made to give a positive grip by hand screws, wedges, or levers,—and that the segments may be moved by means other than the cam ring, such as levers, screws, &c., all of which are well known to mechanicians and need not therefore be described. It will be obvious also that either one of our improvements may be used without the others, as for instance, the oblique planes of the junctions of the segments constituting the die may be advantageously used without the mode of giving the stiffness to the core stem, or the sliding ferrule on which the end of the pipe is gripped,—and so of either of the other two; but the employment of the three together will be vastly better. And it will be equally obvious to mechanicians that our improvements are applicable to other operations as well as welding pipes, as for instance the improvement in the die is applicable to all operations of drawing metals through dies, and the ferrule and mode of giving stiffness to the core is equally applicable to any operation of drawing or beading which it may be desired to perform in metal pipes.

What we claim as our invention, and desire to secure by Letters Patent, is—

1. Forming the junctions of the segments of the die in planes diagonal to the axis of the die substantially as described, whereby the forming of ridges on the surface of the metal drawn through it is avoided.

2. We claim the employment of a ferrule or thimble in combination with a core the head of which is of greater diameter than the stem and with grippers, tongues, or other analogous device or instrument, substantially as herein described, whereby much friction is saved by passing the pipe over the core, and the grippers are prevented from mashing the pipe, as described.

3. We claim the method of giving support or stiffness to the stem of the core by means of the stay pieces in combination with the rails and core, substantially as described.

JOSEPH C. VAUGHN.
JNO. F. WINSLOW.

Witnesses:
ARCHIBALD BULL,
GEO. DAY.